United States Patent [19]

Brimhall

[11] Patent Number: 5,025,842
[45] Date of Patent: * Jun. 25, 1991

[54] FENCE RAIL AND METHOD AND APPARATUS OF MANUFACTURING THE SAME

[76] Inventor: Frank E. Brimhall, 760 E. 300 South, Orem, Utah 84057

[*] Notice: The portion of the term of this patent subsequent to Aug. 25, 2004 has been disclaimed.

[21] Appl. No.: 818,229

[22] Filed: Jan. 13, 1986

[51] Int. Cl.$^5$ .............................................. B27M 1/08
[52] U.S. Cl. ..................................... 144/367; 144/12; 144/3 R; 144/365; 144/4; 256/65; 408/37; 408/41
[58] Field of Search ................. 144/2 R, 12, 3 R, 1 B, 144/4, 365, 367; 408/37, 41; 256/65, 67

[56] References Cited

U.S. PATENT DOCUMENTS

| 218,985 | 8/1879 | Kimball | 408/37 |
|---|---|---|---|
| 654,461 | 7/1900 | Koester | 408/37 |
| 2,303,480 | 12/1942 | Lipic, Jr. | 144/12 |
| 2,597,099 | 5/1952 | Hayhurst | 144/12 |
| 3,004,751 | 10/1961 | Woodward | 256/65 |
| 4,138,094 | 2/1979 | Thir | 256/67 |
| 4,142,711 | 3/1979 | Brimhall | 256/65 |
| 4,146,350 | 3/1979 | Bokelmann | 408/41 |

*Primary Examiner*—W. Donald Bray
*Attorney, Agent, or Firm*—M. Reid Russell

[57] ABSTRACT

A machine for milling fence rails and the like having a pair of opposed milling units, each having a cutter head with a conically shaped inner surface, cutting knives arranged to taper material inserted into the heads to the shape of the inner surface and to form a projecting tine that is also tapered.

5 Claims, 3 Drawing Sheets

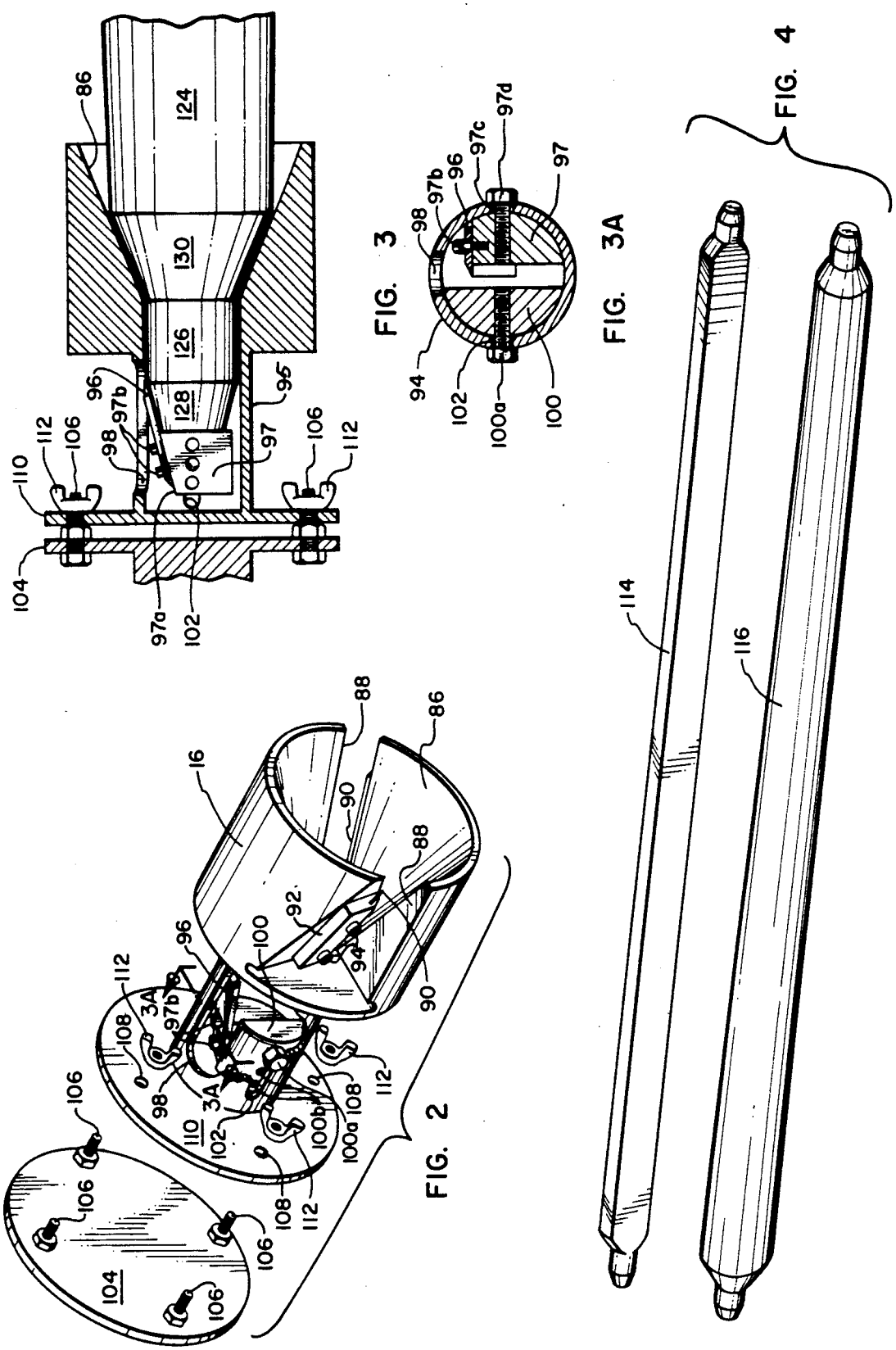

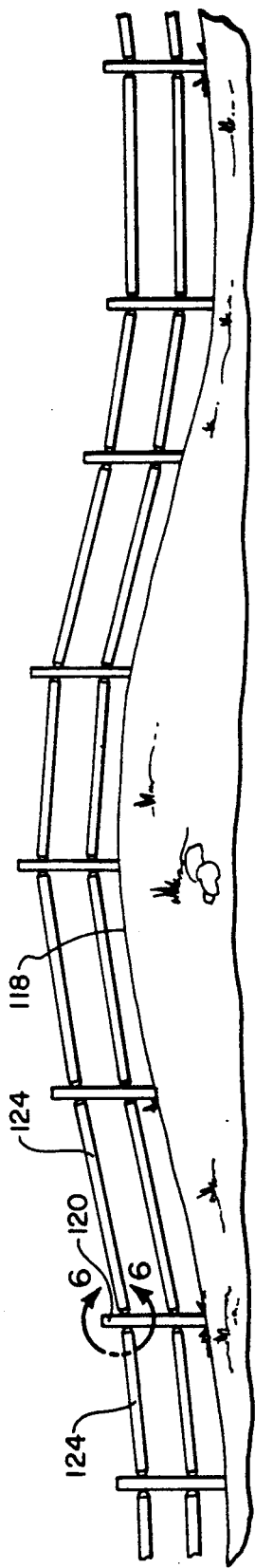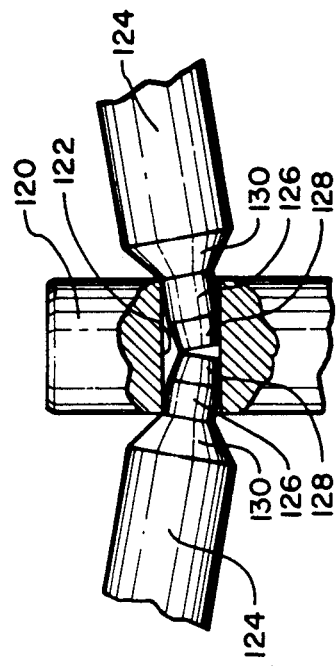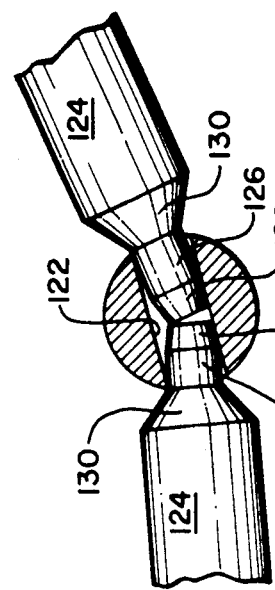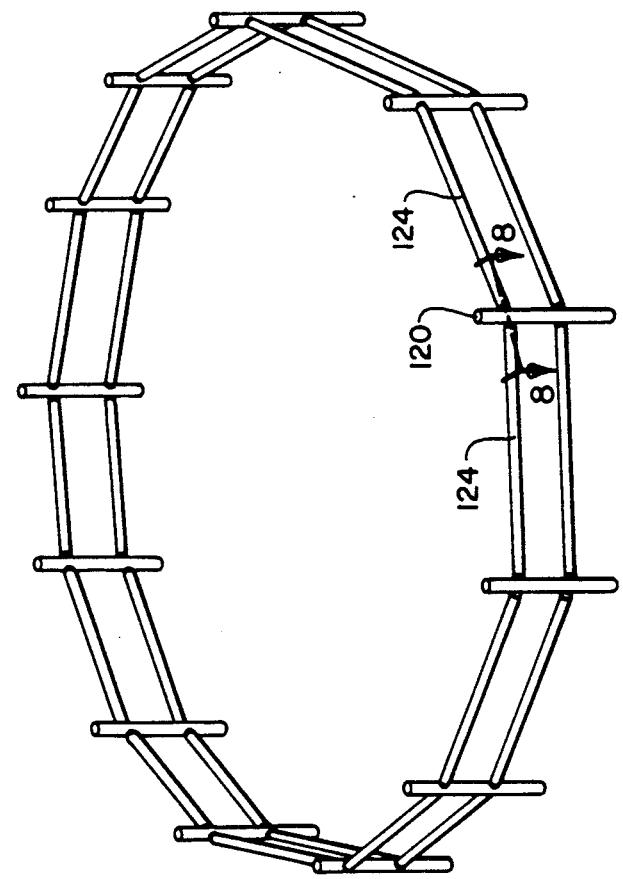

1

FENCE RAIL AND METHOD AND APPARATUS OF MANUFACTURING THE SAME

BACKGROUND OF THE INVENTION

1. Field of the Invention

This invention relates to fence rails and a method of and apparatus for manufacturing the same. The apparatus is related to horizontal milling machines.

2. Prior Art

Means for interconnecting horizontal fence rails to vertical posts are well known. Many devices have been proposed in the past to hold the rails in position to the posts. The Simpson-Strong Tie Company, Inc., of San Leandro, Calif., has manufactured a light-gauge fence bracket which they refer to as their Strong Tie FB model. The Simpson Company has also patented a sloped, adjustable hanger which is protected by U.S. Pat. Nos. 4,230,416, 4,291,996 and 4,423,977, as well as other patents that may be pending. However, these devices have the disadvantage of being expensive to use in large quantities, are labor costly in their installation and require the handling of many fasteners i.e., nails or screws to mount such devices. They also have the disadvantage of requiring availability of at least two devices, i.e., one device for a perpendicular installation with relationship of the rail to the post and another device for an angular installation where the rail comes into the post at an angle.

BRIEF DESCRIPTION OF THE INVENTION

Summary of the Invention

The present invention comprises a fence rail tapered at opposite ends, and the method of and apparatus for making such a rail. A horizontal milling machine with moveable milling units mounted on tracks that are parallel to the fence rail material that is to be milled is preferably used to practice the method of the invention. The moveable milling units contain cutter heads that are independently mounted on the units so that they can be quickly changed to accommodate a variety of sizes. The cylindrical cutting heads produce fence rails with tine ends that contain special tapers to allow the horizontal fence rails to interconnect with standard drilled posts in a fashion that allows them to be readily adapted for use on hilly or sloped surfaces as well as on level ground. The fence rails can also be used in combination with standard drilled posts to form circular compounds or make semi-circular or S-curve alignments in a fence including horizontal and vertical curves, as needed.

OBJECTS OF THE INVENTION

A principal object of the present invention is to provide a means whereby a fence rail is manufactured with a tine end containing a taper between the fence rail body and the tine as well as a taper on the tine end that allows the fence rail to be used with standard drilled posts to accommodate a variety of rail to post positions. The tapers allow the fences to be used on a vertically inclined or curved surfaces as well as arranged in a horizontal circular or curved pattern or in a combination of vertical and horizontal curves, as needed.

FEATURES OF THE INVENTION

A principal feature of the invention is in the use of a cylindrical shaped cutter head with a conical inner-surface that allows fence rail materials to be milled with the tine ends that contain tapers both between the rail body and the tines and on ends of the tines.

Another feature of the invention is that the cutter head in each milling unit is rotated in an opposite direction to create opposing forces that stabilize the material being milled and prevent it from rotating with the cutter heads. Yet an additional feature of the invention is the jaw-like clamping means that is actuated by pressure and that assists in clamping a variety of fencing materials of different shapes to prevent rotation with the cutter heads.

Still another feature of the invention is the adjustable cutter head stop that can be preset to determine the length of the tine.

Yet another feature is an adjustable tine tapering blade that determines the amount of taper to be cut into the tine.

Other objects and features of the invention will become apparent from the following detailed description and drawings, disclosing what are presently contemplated as being the best modes of the invention.

THE DRAWING

In the drawings:

FIG. 1 is a perspective view of the horizontal milling machine.

FIG. 2, an enlarged view of the cylindrical cutter head and the mounting place on the milling unit to which it is attached.

FIG. 3, a cross sectional view of the cylindrical cutting head mounted on the base plate of the milling unit, with the end of a typical horizontal fence rail that has been milled with a tapered surface between the body of the rail and a tine as well as a tapered surface on an end of the tine;

FIG. 3a, a cross sectional view taken on line 3a—3a of FIG. 2 through a central cylindrical portion containing a tine knife, support block and tine stop block;

FIG. 4, a perspective view of two types of typical horizontal fence rails shown, with tines and tapers cut on both ends;

FIG. 5, an elevational view of a typical post and rail fence of the invention installed on sloped terrain;

FIG. 6, an enlarged view of the connection between a standard drilled vertical post and the horizontal rails of the invention, with the post broken away to show the hole that receives the tines of the horizontal rails;

FIG. 7, a perspective view of a typical circular post and rail compound; and

FIG. 8, a cross sectional view, taken through a vertical post and showing how the tines interconnect with the drilled hole in the standard fence post.

DETAILED DESCRIPTION OF THE INVENTION

Figure 1:
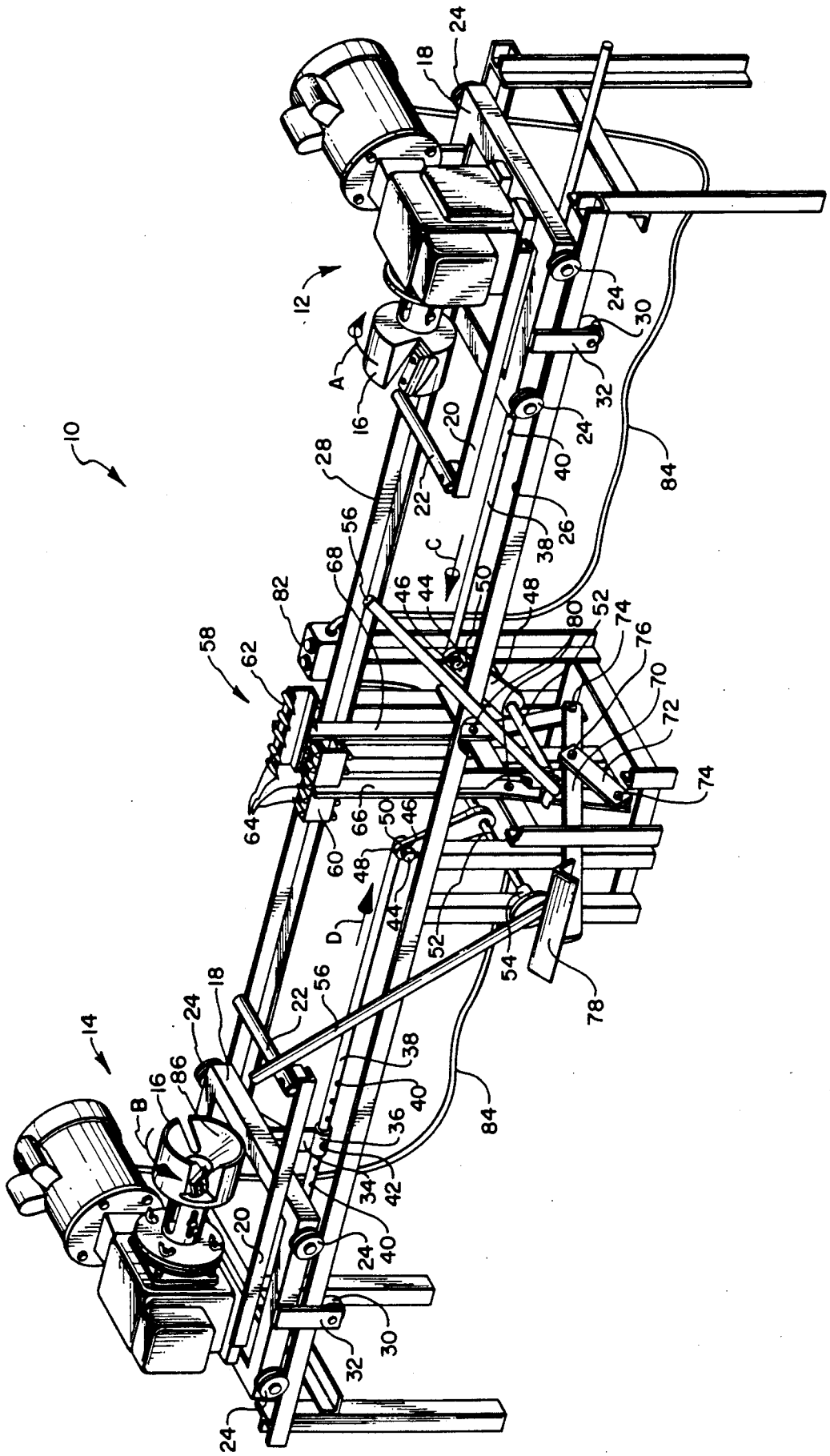

Referring now to the drawings:

In the illustrated apparatus of the preferred embodiment, the horizontal milling machine of the invention is shown generally at 10. Two milling units are mounted on opposite ends of the milling machine. A right-hand milling unit, shown generally at 12, is mounted on the right end (FIG. 1) and a left-hand milling unit is shown generally at 14 and is mounted on the left end, as viewed in FIG. 1. Each milling unit includes a cylinder shaped cutter head 16. The right-hand milling unit is geared to turn the cylinder shaped cutter head 16 in a clockwise fashion as shown by motion arrow A, when viewed from the central area of the horizontal milling machine.

Likewise, the left-hand milling unit is equipped with a cylinder shaped cutter head that rotates counterclockwise as shown by motion arrow B, when viewed from the central area of the horizontal milling machine. Both milling units are equipped with a carriage structure 18 that supports the milling units and cutter heads.

An angle extension 20 that has a pipe arm 22 mounted at right angles to the angle extension is attached to the carriage structure and milling unit. This pipe arm acts as a support upon which the horizontal fence rail material is placed prior to milling the ends. The carriage structure of the milling unit also includes mounted wheels 24. The wheels 24 operate on spaced, parallel rails 26 and 28. Another wheel 30 is attached to a bracket 32 that is suspended from each carriage structure 18. The wheel 30 traverses along the underside of rails 26 and 28, respectively, to keep the milling units 12 and 14 from jumping off the tracks 26 and 28 during a milling operation. A bracket 34, which has a sleeve 36 welded on one end depends from the underside of carriage structure 18. A rod 38 is inserted through sleeve 36 and extends outwardly from both ends thereof. Holes 40 are spaced along rod 38 and pin 42 is inserted through sleeve 36 and into a selected one of the holes 40. One end of rod 38 contains an L-shaped bend 44 that is inserted through hole 46 in one end of a lever 48; and the L-shaped bend is locked in place by pin 50. The other end of lever 48 is welded, or otherwise secured to a rod 52, that is supported on the horizontal milling machine framework by inserting it through sleeves 54. One end of each rod 52 has a handle 56 welded thereon, and as the handles 56 are moved to a vertical position, they also rotate levers 48 toward the central portion of the horizontal milling machine and thereby move the milling units toward rail stock that is to be milled and that is positioned between the milling units.

A jaw-like clamping means, shown generally at 58 is shown substantially in the central portion of the horizontal milling machine. The clamping means is comprised of two U-shaped clamping jaws 60 and 62 that contain spikes 64. The U-shaped jaws 60 and 62 attach, respectively, to vertical levers 66 and 68. A scissor-like spreading device consisting of bars 70 and 72 is attached to the other end of vertical levers 66 and 68. The bars are pivotally connected to each other by pin 76. Bar 70 extends outwardly from the horizontal milling machine and has a bar-angle step 78 welded to its end. As pressure is exerted downwardly on step 78, bars 70 and 72 are likewise moved downwardly and cause the vertical levers 66 and 68 to pivot about pins 80, thereby moving the U-shaped jaw clamps 60 and 62 together, at the other end of the vertical levers 66 and 68.

In operation, a piece of rail stock is placed between the U-shaped clamping jaws 60 and 62 and is supported on pipe arm 22. The operator then turns on the milling units with switch 82. Switch 82 is flexibly connected to the milling units by the usual electrical flex cords 84. The operator then advances both milling units towards the rail stock by pulling handles 56 into an upright vertical position which, in turn, advances the milling units 12 and 14 in the direction of motion arrows C and D, respectively. The ends of the rail stock are aligned with and move into inner conical surfaces of the cylindrical milling heads 16. As best seen in FIG. 2, each conical surface 86 has slots 88 therethrough and knives 90 protruding thereinto. The knives are held in proper position by knife brackets 92 that are attached to the slot walls by anchor bolts 94. As the rotating cylindrically shaped cutter heads advance toward the fence rail stock, the knives 90 cut the end of the stock rail material with a uniform taper. Because the knives are only positioned along a conical surface, the central portion of the fence stock is not cut, but advances inwardly towards a cylindrically shaped central portion 95.

The fence rail stock extending into the cylinderically shaped central portions of the milling units becomes a tine on the completed fence rail. As each milling unit advances, the tine formed thereby engages another cutter knife 96 that is mounted on an adjustable half cylinder knife base 97. Knife base 97 has an angular surface 97a that supports cutter knife 96 at the proper angle to taper the tine. Anchor screws 97b are drilled and tapped into knife base 97 and lock into cutting position knife 96 on base 97. Slot 98 in the central cylindrical shape portion 94 provides an opening through which cuttings from cutter knife 96 are removed, this is best seen in FIG. 3a. Knife base 97 is adjustable along slot 97c and is locked by tightening bolt 97d which draws the cylindrical shaped surface of knife base 97 against the side wall of the central cylindrical shaped portion 94 and the head of bolt 97d which is also shown in FIG. 3a. In operation the cutting heads on the milling unit continue to advance on the horizontal rail material until the tines on the rail material strikes the preset tine stop 100. The tine stop also can be positioned at any point along slot 102 by tightening tine stop bolt 100a which clamps the wall of the cylindrical shaped central portion between the head of bolt 100a and tine stop 100. The location of the tine stop along slot 102 determines the length of the tine. Tine stop 100 also contains additional holes 100b that provide additional flexibility in positioning the tine stop with respect to slot 102.

The cylindrically shaped cutter heads are attached to the milling unit base plate by anchor bolts 106. Bolts 106 are inserted through holes 108 in the support plate 110 of the cutter heads. Wing nuts 112 are then threaded onto anchor bolts 106 to lock the support plate of cutter heads 16 onto base plate 104.

As shown best in FIG. 4, a variety of horizontal fence materials can be used as tine rail stock in the present milling machine. Such materials include rectangular rail stock 114 or a section of native tree trunk, even though the end diameters may be of different size, as shown with native stock 116.

The conical surface 86 of the cylindrical cutter head 16 will accommodate a variety of rail stock and has the ability to align itself perfectly on any suitable stock by centering the stock within the conical area such that the knives protruding into the conical area will cut the tine and tapers on the central-most portion of the rail stock.

FIG. 5 shows an installed post and rail fence on a sloped surface 118. Post 120 in FIG. 5 has been enlarged and broken away in FIG. 6 to show the horizontally bored hole 122 through fence post 120 that receives the tines of the horizontal fence rails 124. Tines 126 of horizontal rails 124 are inserted into holes 122, and the horizontal rails can be moved up or down in hole 122 until the tine tapered surface 128 bears against the side walls of hole 122. Furthermore, the rail tapered surface 130 prevents any of the rail material from binding against the vertical surfaces of post 120 and allows for maximum adjustment of the horizontal rail 124 with relationship to the contour of the sloped surface 118. FIG. 7, likewise, illustrates the flexibility of adjusting the horizontal rails until the tapered surface 128 of tine 126 contacts the side wall surface of hole 122. This alignment allows the horizontal rails to project at an angle from post 120 and to eventually make a complete circular compound as shown in FIG. 7.

The tine tapered surface 128 allows greater flexibility in positioning the tines in the hole 122 of vertical post 120. After the tines have been set in the post holes 120, a spike or similar anchoring means is driven through the post and tine, thereby locking the tine and horizontal rail to the post. The taper on the tine permits pre-setting of the position of the horizontal rail with respect to the post, before the rail and post are anchored together. The advantage of adjusting the horizontal rails to the contour of the land as well as being able to change the direction of the fence by positioning the horizontal rails in the proper direction gives the fence builder greater flexibility with standard fence components and reduces the time and the expense of building a fence under these conditions.

Although a preferred form of my invention has been disclosed, it is to be understood that the present disclosure is by way of example and that variations are possible without departing from the subject matter coming within the scope of the following claims, which subject matter I regard as my invention.

I claim:

1. A horizontal milling machine for use in tapering opposite ends of logs comprising a pair of movable milling units each mounted on tracks that are parallel to material to be milled; means for mounting said milling units to said tracks for movement of each said milling unit independent of the other said unit; a cutter head carried by each said milling unit each of which cutter heads has a conical shaped inner surface that aligns and directs material being milled into the center thereof and with each conical surface containing at least one slot with a cutting knife mounted therein for milling the ends of the material to conform to the conical shaped inner surface; clamping means between the cutter heads to immobilize fence rail stock to be milled by the cutter heads; and means for driving each of said cutter heads independently of the other and oppositely to the direction of rotation of the other.

2. A horizontal milling machine as in claim 1, wherein the cutter head contains at least one cutting knife which are mounted and project internally through slots in the head to cut a tapered surface on the material being milled and to further cut a tine and another tapered surface on the tine.

3. A horizontal milling machine as in claim 2, further including
stop means on the cutter head, said stop means being adjustable whereby the length of the tine can be preset.

4. A horizontal milling machine as in claim 3, wherein the slots for the cutting knives are enlarged to permit chips and cuttings to fall free of the cutter head.

5. A method of forming a fence rail comprising
forming a tapered shoulder adjacent each end of a fence rail stock;
forming a tine projecting from the smallest portion of each tapered shoulder and extending outwardly from such tapered shoulder; and
forming a taper on the end of each tine.

* * * * *